United States Patent
Wang et al.

(10) Patent No.: US 10,673,323 B2
(45) Date of Patent: Jun. 2, 2020

(54) LOOP NOISE BALANCE TECHNIQUE FOR CM EMI NOISE REDUCTION OF THE FULL BRIDGE LLC RESONANT CONVERTER

(71) Applicant: UNIVERSITY OF FLORIDA RESEARCH FOUNDATION, INCORPORATED, Gainesville, FL (US)

(72) Inventors: Shuo Wang, Gainesville, FL (US); Huan Zhang, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 0 days.

(21) Appl. No.: 16/343,134

(22) PCT Filed: Oct. 20, 2017

(86) PCT No.: PCT/US2017/057540
§ 371 (c)(1),
(2) Date: Apr. 18, 2019

(87) PCT Pub. No.: WO2018/080913
PCT Pub. Date: May 3, 2018

(65) Prior Publication Data
US 2019/0319532 A1    Oct. 17, 2019

Related U.S. Application Data

(60) Provisional application No. 62/413,476, filed on Oct. 27, 2016.

(51) Int. Cl.
*H02M 1/44* (2007.01)
*H02M 1/42* (2007.01)
(Continued)

(52) U.S. Cl.
CPC .......... *H02M 1/44* (2013.01); *H02M 3/33576* (2013.01)

(58) Field of Classification Search
CPC ................. H02M 1/44; H02M 1/4241; H02M 2007/4815; H02M 2007/4818; H02M 7/523
See application file for complete search history.

(56) References Cited

U.S. PATENT DOCUMENTS 5,724,236 A * 3/1998 Oglesbee ................ H02M 1/12
                                                       363/131
7,768,369 B2 * 8/2010 Park ....................... H01F 27/289
                                                       336/84 C
(Continued)

FOREIGN PATENT DOCUMENTS

| JP | 2011050134 A | 3/2011 |
| JP | 2012034522 A | 2/2012 |
| WO | 2012037135 A1 | 3/2012 |

OTHER PUBLICATIONS

International Search Report and Written Opinion dated Feb. 7, 2018, for PCT Application No. PCT/US2017/057540, pp. 1-11.

*Primary Examiner* — Adolf D Berhane
*Assistant Examiner* — Sisay G Tiku
(74) *Attorney, Agent, or Firm* — Alston & Bird LLP

(57) ABSTRACT

A full bridge LLC resonant converter can include: a full bridge circuit including a first input node and a second input node; a LLC resonant tank circuit connected to the first input node and the second input node; a transformer winding part connected to the LLC resonant tank circuit; a rectifier circuit connected to the transformer through a first output node and a second output node; and a capacitor connected between the first input node and the first output node. The LLC resonant tank circuit can include a resonant capacitor connected to the first input node, a resonant inductor connected to the reso-
(Continued)

nant capacitor, and a magnetizing inductance connected between the resonant inductor and the second input node.

29 Claims, 5 Drawing Sheets

(51) Int. Cl.
  *H02M 7/48* (2007.01)
  *H02M 7/523* (2006.01)
  *H02M 3/335* (2006.01)

(56) References Cited

U.S. PATENT DOCUMENTS

| | | | |
|---|---|---|---|
| 8,605,463 B2 | 12/2013 | Nakanishi | |
| 9,729,062 B2* | 8/2017 | Cummings | H02M 3/335 |
| 10,069,400 B1* | 9/2018 | Morgan, Jr. | H02M 1/12 |
| 2007/0047269 A1* | 3/2007 | Hachiya | H02M 3/33523 363/21.17 |
| 2007/0268106 A1* | 11/2007 | Lee | H03H 7/42 336/200 |
| 2008/0238375 A1* | 10/2008 | Chen | H02M 1/44 323/234 |
| 2009/0212754 A1* | 8/2009 | Ryan | H02M 1/14 323/282 |
| 2010/0202160 A1* | 8/2010 | Kim | H01F 27/38 363/16 |
| 2011/0051467 A1* | 3/2011 | Nakanishi | H02M 3/337 363/21.02 |
| 2012/0063173 A1* | 3/2012 | Fu | H02M 3/28 363/21.02 |
| 2012/0294047 A1* | 11/2012 | Wang | H02M 3/33576 363/21.02 |
| 2013/0242452 A1* | 9/2013 | Park | H01F 27/40 361/143 |
| 2013/0301306 A1* | 11/2013 | Hosotani | H02M 3/3353 363/17 |
| 2013/0301308 A1* | 11/2013 | Hosotani | H02M 3/3381 363/21.03 |
| 2014/0254203 A1* | 9/2014 | Dai | H02M 3/3353 363/17 |
| 2014/0268899 A1* | 9/2014 | Hosotani | H02M 3/33569 363/17 |
| 2015/0109824 A1* | 4/2015 | Chen | H02M 3/22 363/17 |
| 2015/0124488 A1 | 5/2015 | Dai et al. | |
| 2015/0131329 A1* | 5/2015 | Chen | H02M 1/08 363/17 |
| 2016/0254755 A1 | 9/2016 | Deboy | |
| 2017/0214278 A1* | 7/2017 | Hosotani | H02J 50/12 |
| 2017/0317596 A1* | 11/2017 | Ishigaki | H02M 3/285 |
| 2017/0324341 A1* | 11/2017 | Shin | H02M 3/33546 |
| 2017/0324346 A1* | 11/2017 | Shin | H02M 3/33584 |
| 2018/0074538 A1* | 3/2018 | Zhang | H02M 3/335 |
| 2018/0083545 A1* | 3/2018 | Vijayan | H02M 3/33546 |

* cited by examiner

US 10,673,323 B2
// 1

LOOP NOISE BALANCE TECHNIQUE FOR CM EMI NOISE REDUCTION OF THE FULL BRIDGE LLC RESONANT CONVERTER

CROSS REFERENCE TO RELATED APPLICATIONS

This application is a National Stage Application, filed under 35 U.S.C. 371, of International Application No. PCT/US2017/057540, filed Oct. 20, 2017, which claims the benefit of U.S. Provisional Patent Application Ser. No. 62/413,476, filed Oct. 27, 2016, which is incorporated herein by reference in its entirety, including any figures, tables, and drawings.

BACKGROUND OF INVENTION

LLC resonant converters have several desired features, such as high power, high power density, and high efficiency, thereby broadening the appeal of these converters. Existing LLC resonant converters can be classified as a half bridge resonant converter or a full bridge resonant converter according to a switching input circuit. While the number of switches in the half bridge resonant converter is half of that in the full bridge resonant converter, the half bridge resonant converter has twice the current of the full bridge resonant converter. Thus, the half bridge resonant converter is widely used in flat panel TVs and personal computers, and the full bridge resonant converter is used in application requiring high primary currents, such as photovoltaic applications and solar micro inverters. However, LLC resonant converters generate large common mode (CM) electromagnetic interference (EMI), which is a big drawback in a variety of applications.

BRIEF SUMMARY

Embodiments of the subject invention provide novel and advantageous full bridge resonant converters that include a capacitor connecting an input node of a full bridge circuit with respect to a resonant tank circuit (e.g., an LC circuit) to an output node of a transformer.

In an embodiment of the present invention, a full bridge resonant converter can include: a full bridge circuit receiving an input signal; a resonant tank circuit connected to the full bridge circuit; a transformer connected to the resonant tank circuit; a rectifier circuit connected to the transformer and producing an output signal; and a capacitor connecting an input node of the full bridge circuit with respect to the resonant tank circuit to an output node of the transformer.

In another embodiment of the present invention, a resonant converter can include: a primary side input circuit receiving an input signal; a transformer connected to the primary side input circuit; a secondary side output circuit connected to the transformer and providing an output signal; and a capacitor connecting the primary side input circuit to the secondary side output circuit.

In another embodiment of the present invention, a full bridge LLC resonant converter can include: a full bridge circuit including a first input node and a second input node; an LLC resonant tank circuit connected to the first input node and the second input node; a transformer winding part connected to the LLC resonant tank circuit; a rectifier circuit connected to the transformer winding part through a first output node and a second output node; and a capacitor connected between the first input node and the first output node.

DETAILED DISCLOSURE

Embodiments of the subject invention provide novel and advantageous full bridge LLC resonant converters including a full bridge circuit, an LLC resonant tank circuit connected to the full bridge circuit, a transformer winding part connected to the LLC resonant tank circuit, and a rectifier circuit connected to the transformer winding part. By connecting a capacitor between an input node of the full bridge circuit with respect to the LLC resonant tank circuit and an output node of the transformer winding part, the full bridge LLC resonant converter can make loop noise and reduce the common mode (CM) electromagnetic interference (EMI).

Figure 1:
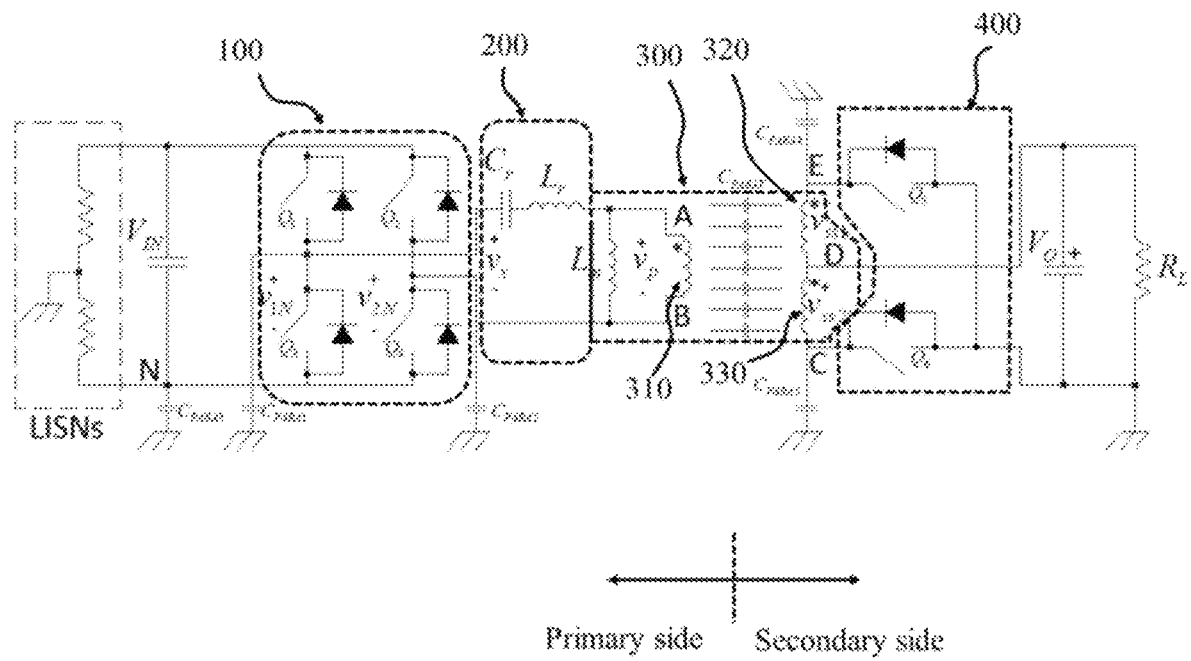
FIG. 1 shows a full bridge LLC resonant converter.

FIG. 1 shows a full bridge LLC resonant converter including a full bridge circuit and an LLC resonant tank circuit. Referring to FIG. 1, the full bridge LLC resonant converter comprises a full bridge circuit 100 receiving an input signal $V_{IN}$, an resonant tank circuit 200 connected to the full bridge circuit 100, a transformer 300 connected to the resonant tank circuit 200, and a rectifier circuit 400 connected to the transformer 300 and providing an output signal $V_O$.

The full bridge circuit 100 comprises a first switch Q1, a second switch Q2, a third switch Q3, and a fourth switch Q4, such that the current resonates in a positive direction through the first switch Q1 and the fourth switch Q4, and the current resonates in the negative direction through the second switch Q2 and the third switch Q3. The full bridge circuit 100 is configured to be connected to a Line Impedance Stabilization Network (LISN) through a negative node N.

The resonant tank circuit 200 comprises a resonant capacitor $C_r$ connected to the full bridge circuit 100 and a resonant inductor $L_r$ connected to the resonant capacitor $C_r$. The resonant capacitor $C_r$ is connected to the first switch Q1 and the third switch Q3, and the resonant inductor $L_r$ is coupled to the second switch Q2 and the fourth switch Q4.

The transformer 300 comprises a magnetizing inductance $L_m$, a primary winding 310, a first secondary winding 320, and a second secondary winding 330. The magnetizing inductance $L_m$ is connected between the resonant inductor $L_r$ and the full bridge circuit 100, thereby making an LLC resonant tank circuit including the resonant capacitor $C_r$, the resonant inductor $L_r$, and the magnetizing inductance $L_m$ connected in series. The primary winding 310 is connected to the resonant tank circuit 200 through a primary upper node A and a primary lower node B. The first secondary winding 320 is connected between a first output node E and a middle output node D, and the second secondary winding 320 is connected between the middle output node D and a second output node C.

The rectifier circuit 400 comprises a fifth switch Q5 connected to the first output node E and a sixth switch Q6 connected to the second output node C. The rectifier circuit 400 is configured to be connected to a load $R_L$ and provide the output signal $V_O$.

The full bridge LLC resonant converter divides a primary side and a secondary side with regard to the transformer 300. That is, the full bridge circuit 100 and the resonant tank circuit 200 are placed at the primary side, and the rectifier circuit 400 is placed at the secondary side. In addition, the full bridge LLC resonant converter has several parasitic capacitances including $C_{PARA1}$-$C_{PARA5}$ and $C_{PARAT}$.

Figure 2:
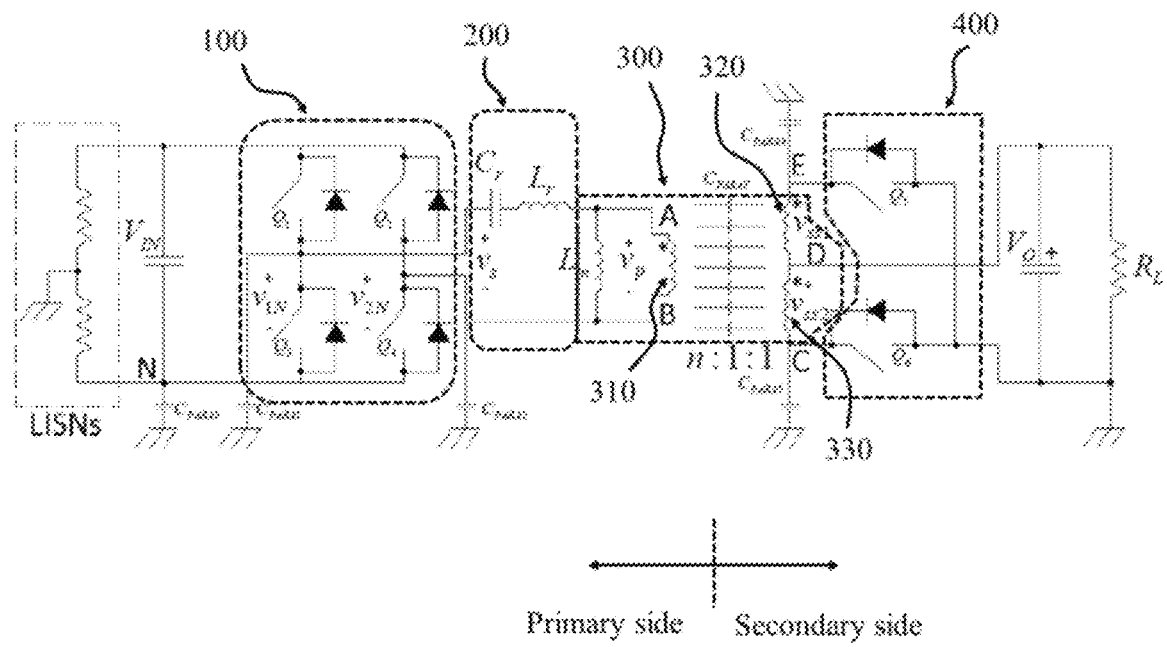
FIG. 2 shows noise sources of a full bridge LLC resonant converter.

FIG. 2 shows several noise sources of a full bridge LLC resonant converter. Referring to FIG. 2, the full bridge LLC resonant converter has several noise sources because of high voltage slew rate (dv/dt). For example, in case a winding ratio of the primary winding 310, the first secondary winding 320, and the second secondary winding 330 is n:1:1, the $v_{1N}$ voltage of the third switch Q3, the $v_{2N}$ voltage of the fourth switch Q4, and the $v_P$ voltage of the primary winding 310 could be noise sources in the primary side. In addition, the $v_{SS1}$ voltage of the first secondary winding 320 and the $V_{SS2}$ voltage of the second secondary winding 330 could be noise sources in the secondary side, wherein the noise sources meet the following two conditions.

$$v_{1N} = -v_{2N}$$

$$v_P = nv_{SS1} = nv_{SS2}$$

The noise source $v_{2N}$ of the fourth switch Q4 and the noise source $v_P$ of the primary winding 310 make a noise loop and generate all CM noise. That is, this noise loop by the noise source $v_{2N}$ voltage and the noise source $v_P$ voltage becomes a main noise loop.

Figure 3:
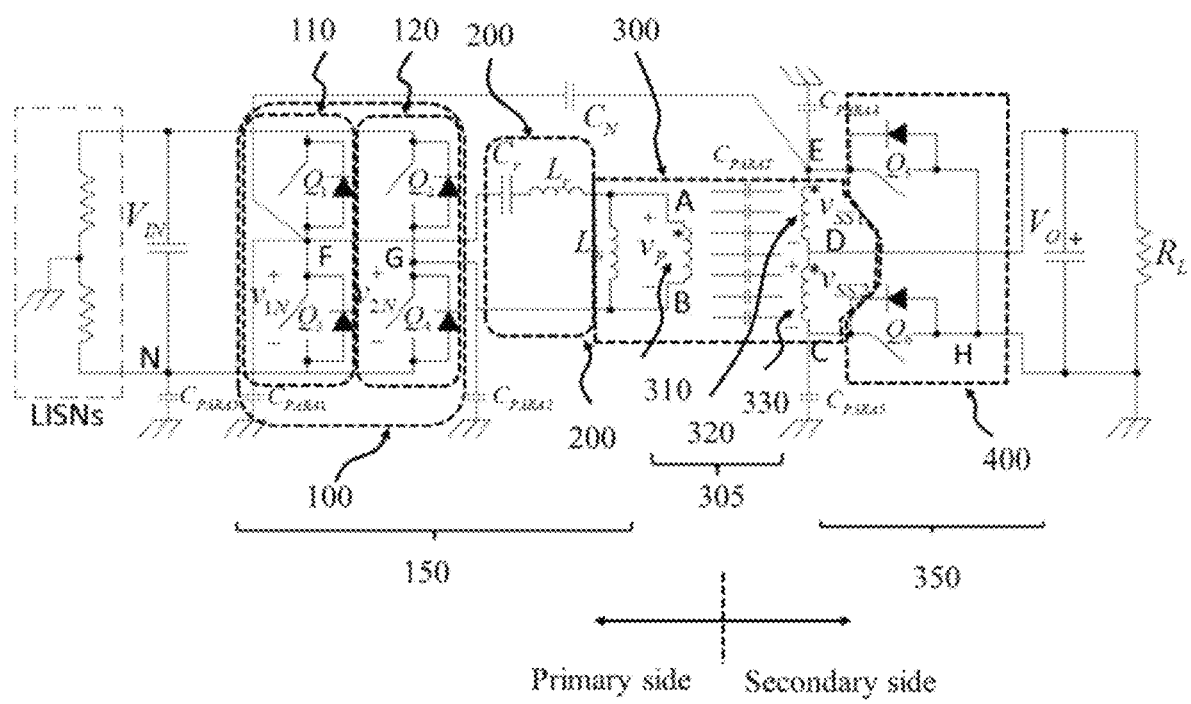
FIG. 3 shows a full bridge LLC resonant converter according to an embodiment of the subject invention.

In embodiments of the subject invention, the CM noise generated by the main noise loop can be solved by connecting a capacitor between the primary side and the secondary side of the transformer. FIG. 3 shows a full bridge LLC resonant converter according to an embodiment of the subject invention. Referring to FIG. 3, the full bridge LLC resonant converter can comprise a full bridge circuit 100 receiving an input signal $V_{1N}$, an resonant tank circuit 200 connected to the full bridge circuit 100, a transformer 300 connected to the resonant tank circuit 200, a rectifier circuit 400 connected to the transformer 300 and providing an output signal $V_O$, and a capacitor $C_N$ connecting a first input node F and a first output node E.

A primary side input circuit 150 placed at the primary side from the transformer 300 can comprise the full bridge circuit 100 and the resonant tank circuit 200, wherein the primary side input circuit 150 receives the input signal $V_{1N}$.

The full bridge circuit 100 can comprise a plurality of switches. For example, the plurality of switches can include a first switch Q1, a second switch Q2, a third switch Q3, and a fourth switch Q4, such that the first switch Q1 and the third switch Q3 are connected in series through the first input node F, and the second switch Q2 and the fourth switch Q4 are connected in series through a second input node G. A first pair 110 of the first switch Q1 and the third switch Q3 can be connected in parallel to a second pair 120 of the second switch Q2 and the fourth switch Q4. The input signal $V_{1N}$ can be connected to both ends of the first pair 110 and both ends of the second pair 120. In addition, each of the first to fourth switches can be embodied as a MOSFET.

The resonant tank circuit 200 can comprise a resonant capacitor $C_r$ connected to the first input node F of the full bridge circuit 100 and a resonant inductor $L_r$ connected to the resonant capacitor $C_r$. The resonant capacitor $C_r$ can be connected to the first switch Q1 and the third switch Q3 of the first pair 110 through the first input node F, and the resonant inductor $L_r$ can be coupled to the second switch Q2 and the fourth switch Q4 of the second pair 120 through the second input node G. That is, the first input node F of the full bridge circuit 100 and the second input node G of the full bridge circuit 100 can function as input nodes with respect to the resonant tank circuit 200.

The transformer 300 can comprise a magnetizing inductance and a transformer winding part 305 including a primary winding 310, a first secondary winding 320, and a second secondary winding 330. The primary winding 310 can be connected to the resonant tank circuit 200 through a primary upper node A and a primary lower node B in such a manner that the primary winding 310 is connected in parallel to the magnetizing inductance $L_m$. The first secondary winding 320 can be connected between the first output node E and a middle output node D, and the second secondary winding 330 can be connected between the middle output node D and a second output node C such that the first 320 and second 330 secondary windings are connected in series.

The magnetizing inductance $L_m$ of the transformer 300 is connected between the resonant inductor $L_r$ and the second input node G. As a result, the resonant capacitor $C_r$ of the resonant tank circuit 200, the resonant inductor $L_r$ of the resonant tank circuit 200, and the magnetizing inductance $L_m$ of the transformer 300 are connected in series, thereby accomplishing an LLC resonant tank circuit.

A secondary side output circuit 350 placed at the secondary side from the transformer 300 can comprise the rectifier circuit 400 and can provide the output signal $V_O$. The rectifier circuit 400 can comprise a fifth switch Q5 connected between the first output node E and a common output node H and a sixth switch Q6 connected between the second output node C and the common output node H. The rectifier circuit 400 can be configured to provide the output signal $V_O$ between the middle output node D and the common output node H. In addition, each of the fifth switch Q5 and sixth switch Q6 can be a diode.

The capacitor $C_N$ can connect the primary side input circuit 150 and the secondary side output circuit 350, thereby making an additional noise loop and canceling the CM noise generated by the main noise loop. The capacitor $C_N$ can be connected to the first input node F of the primary side input circuit 150 and the first output node E of the secondary side output circuit 350, thereby connecting the primary side and the secondary side.

Figure 4:
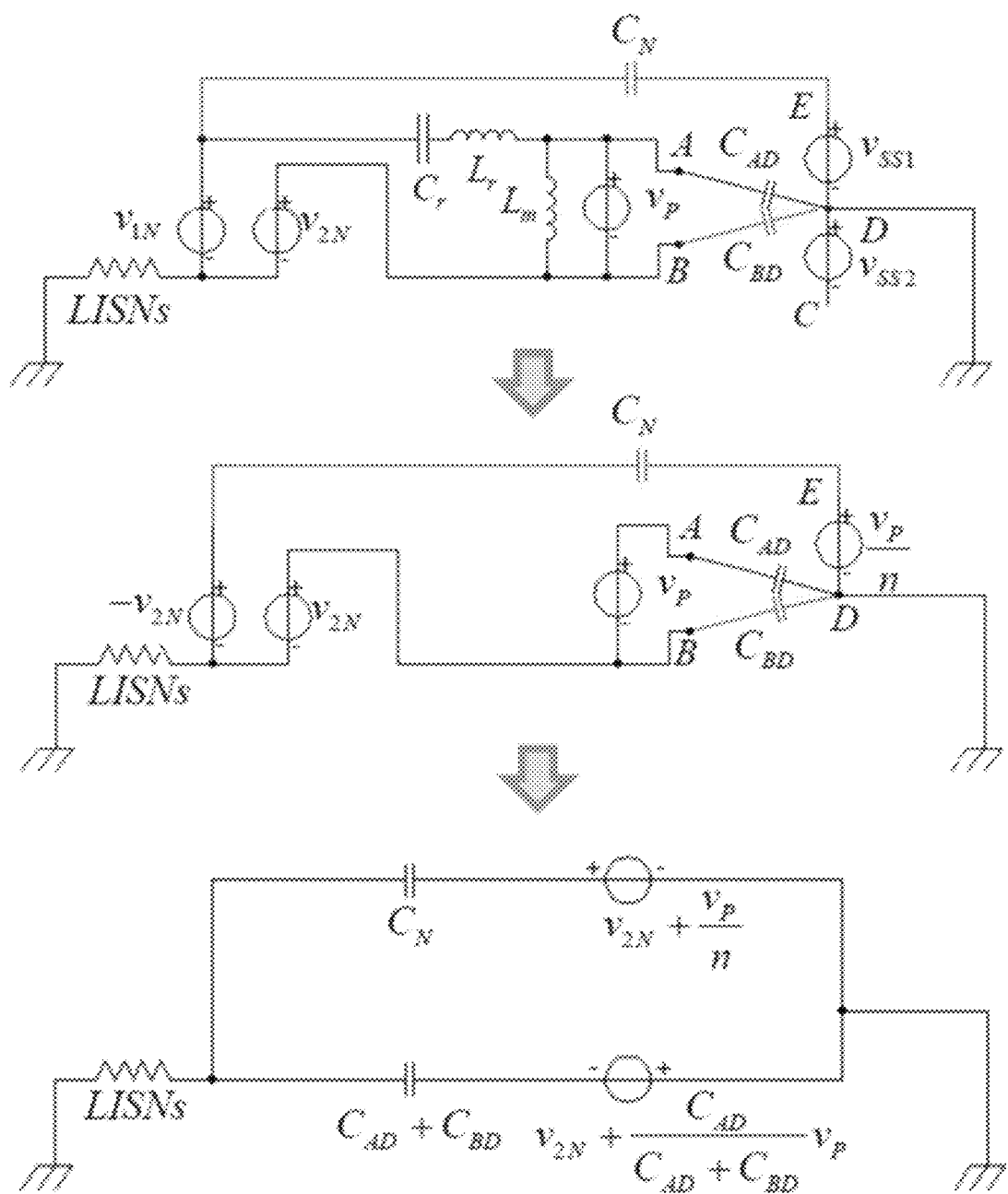
FIG. 4 shows equivalent circuits with regard to a full bridge LLC resonant converter according to an embodiment of the subject invention.

FIG. 4 shows equivalent circuits with regard to a full bridge LLC resonant converter according to an embodiment of the subject invention. Referring to FIG. 4, by connecting the capacitor $C_N$ to the first input node F and the first output node E, the noise source $v_{1N}$ of the third switch Q3 and the noise source $v_{SS1}$ of the first secondary winding 320 can make an additional noise loop that would become a new CM noise loop. The noise sources of the full bridge LLC resonant converter can satisfy the following conditions.

$$v_{1N} = -v_{2N} \quad v_P nv_{SS1} = nv_{SS2}$$

Therefore, it is possible to have the main CM noise generated by the main noise loop and the additional CM noise generated by the additional noise loop made by the capacitor $C_N$ to cancel each other by adjusting their loop impedances. That is, the noise cancelation can be accomplished by adjusting a capacitance $C_{AD}$ between the primary upper node A and the middle output node D and/or a capacitance $C_{BD}$ between the primary lower node B and the middle output node D in such a manner that a ratio of a sum of the capacitance $C_{AD}$ and the capacitance $C_{BD}$ to the capacitance $C_{AD}$ is n:1, wherein n is a winding ratio of the primary winding 310 to the first secondary winding 320 or the second secondary winding 330. A capacitance $C_N$ can be used to represent the sum of the capacitance $C_{AD}$ and the capacitance $C_{BD}$. The adjusting condition to cancel the CM noise can be as follows:

$$\frac{C_{AD}}{C_{AD} + C_{BD}} = \frac{1}{n}, C_N = C_{AD} + C_{BD}$$

The subject invention includes, but is not limited to, the following exemplified embodiments.

Embodiment 1. A Full Bridge Resonant Converter, Comprising:
a full bridge circuit receiving an input signal;
a resonant tank circuit connected to the full bridge circuit;
a transformer connected to the resonant tank circuit;
a rectifier circuit connected to the transformer and producing an output signal; and
a capacitor connecting an input node of the full bridge circuit with respect to the resonant tank circuit to an output node of the transformer.

Embodiment 2. The full bridge resonant converter according to embodiment 1, wherein the resonant tank circuit is connected to the full bridge circuit through the input node, and wherein the rectifier circuit is connected to the transformer through the output node of the transformer.

Embodiment 3. The full bridge resonant converter according to any of embodiments 1-2, wherein the resonant tank circuit comprises a resonant capacitor and a resonant inductor.

Embodiment 4. The full bridge resonant converter according to any of embodiments 1-3, wherein the transformer includes a magnetizing inductance, and the resonant capacitor, the resonant inductor, and the magnetizing inductance are connected in series.

Embodiment 5. The full bridge resonant converter according to any of embodiments 1-4, wherein the full bridge circuit includes a first switch, a second switch, a third switch, and a fourth switch, wherein the first switch and the third switch are connected to each other in series, the second switch and the fourth switch are connected to each other in series, and a first pair comprising the first and third switches and a second pair comprising the second and fourth switches are connected to each other in parallel.

Embodiment 6. The full bridge resonant converter according to embodiment 5, wherein the first switch and the third switch are connected to the capacitor through the input node.

Embodiment 7. The full bridge resonant converter according to any of embodiments 5-6, wherein each of the first, second, third, and fourth switches is a MOSFET.

Embodiment 8. The full bridge resonant converter according to any of embodiments 1-7, wherein the transformer further includes a primary winding at a primary side, a first secondary winding at a secondary side, and a second secondary winding connected in series to the first secondary winding at the secondary side.

Embodiment 9. The full bridge resonant converter according to embodiment 8, wherein the first secondary winding is connected to the capacitor through the output node of the transformer.

Embodiment 10. The full bridge resonant converter according to any of embodiments 1-9, wherein the rectifier circuit includes a fifth switch and a sixth switch, wherein the fifth switch is connected to the output node of the transformer.

Embodiment 11. The full bridge resonant converter according to embodiment 10, wherein each of the fifth switch and the sixth switch is a diode.

Embodiment 12. A resonant converter, comprising:
a primary side input circuit receiving an input signal;
a transformer connected to the primary side input circuit;
a secondary side output circuit connected to the transformer and providing an output signal; and
a capacitor connecting the primary side input circuit to the secondary side output circuit.

Embodiment 13. The resonant converter according to embodiment 12, wherein the primary side input circuit comprises a full bridge circuit receiving the input signal and a resonant tank circuit connected to the full bridge circuit through a first input node and a second input node.

Embodiment 14. The resonant converter according to embodiment 13, wherein the capacitor is connected to the first input node.

Embodiment 15. The resonant converter according to any of embodiments 13-14, wherein the full bridge circuit comprises a first switch, a second switch, a third switch, and a fourth switch, the first switch is connected to the third switch through the first input node, and the second switch is connected to the fourth switch through the second input node.

Embodiment 16. The resonant converter according to any of embodiments 13-15, wherein the resonant tank circuit includes a resonant capacitor connected to the first input node and a resonant inductor connected to the resonant capacitor.

Embodiment 17. The resonant converter according to any of embodiments 12-16, wherein the transformer comprises a magnetizing inductance connected between the resonant inductor and the second input node, a primary winding connected to the magnetizing inductance, a first secondary winding connected to a first output node, and a second secondary winding connected to the first secondary winding through a middle output node.

Embodiment 18. The resonant converter according to embodiment 17, wherein a winding direction of the primary winding is the same as that of the first secondary winding and that of the second secondary winding.

Embodiment 19. The resonant converter according to any of embodiments 12-18, wherein the secondary side output circuit comprises a rectifier circuit comprising a fifth switch connected to the transformer through the first output node and a sixth switch connected to the transformer through a second output node.

Embodiment 20. The resonant converter according to embodiment 19, wherein the fifth switch is connected to the sixth switch through a common output node.

Embodiment 21. The resonant converter according to any of embodiments 17-20, wherein the capacitor is connected to the first output node.

Embodiment 22. The resonant converter according to any of embodiments 20-21, further comprising a load configured to be connected between the middle output node and the common output node.

Embodiment 23. A full bridge LLC resonant converter, comprising:
a full bridge circuit including a first input node and a second input node;
an LLC resonant tank circuit connected to the first input node and the second input node;
a transformer winding part connected to the LLC resonant tank circuit;
a rectifier circuit connected to the transformer winding part through a first output node and a second output node; and
a capacitor connected between the first input node and the first output node.

Embodiment 24. The full bridge LLC resonant converter according to embodiment 23, wherein the LLC resonant tank circuit comprises a resonant capacitor connected to the first input node, a resonant inductor connected to the resonant capacitor, and a magnetizing inductance connected between the resonant inductor and the second input node.

Embodiment 25. The full bridge LLC resonant converter according to any of embodiments 23-24, wherein the transformer winding part comprises a primary winding connected to the magnetizing inductance through a primary upper node and a primary lower node, a first secondary winding connected between the first output node and a middle output node, and a second secondary winding connected between the middle output node and the second output node.

Embodiment 26. The full bridge LLC resonant converter according to embodiment 25, wherein a sum capacitance of a first capacitance between the primary upper node and the middle output node and a second capacitance between the primary lower node and the middle output node is the same as a capacitance of the capacitor between the first input node and the first output node.

Embodiment 27. The full bridge LLC resonant converter according to any of embodiments 25-26, further comprising an assistance capacitor between the primary lower node and the middle output node such that the sum capacitance of the first capacitance between the primary upper node and the middle output node and the second capacitance between the primary lower node and the middle output node is the same as the capacitance of the capacitor between the first input node and the first output node.

Embodiment 28. The full bridge LLC resonant converter according to any of embodiments 26-27, wherein a first ratio of the sum capacitance to the first capacitance is N to 1, and a second ratio of a primary winding voltage between the primary upper node and the primary lower node to a first secondary winding voltage between the first output node and the middle output node is N to 1.

Embodiment 29. The full bridge LLC resonant converter according to any of embodiments 23-28, wherein the full bridge circuit comprises a first switch, a second switch, a third switch, and a fourth switch, the first switch is connected to the third switch through the first input node, and the second switch is connected to the fourth switch through the second input node.

Embodiment 30. The full bridge LLC resonant converter according to embodiment 29, wherein a first input voltage of the third switch and a second input voltage of the fourth switch have the same absolute value but different signs (positive or negative).

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

Example 1—Full Bridge LLC Resonant Converter

The full bridge LLC resonant converter described in FIGS. 1 and 2 can have a winding ratio n of 4, a capacitance $C_{AD}$ of 2.72 nF (nanoFarad), and a capacitance $C_{BD}$ of 4.08 nF. With respect to this full bridge LLC resonant converter, by adding a capacitance of 4.08 nF between the primary lower node B and the middle output node D and adding capacitor $C_N$ of 10.88 nF between the first input node F and the first output node E, the adjusting condition can be satisfied and the CM noise can be reduced or canceled. The addition capacitance between the primary lower node B and the middle output node D can be accomplished by adding an additional capacitor between the primary lower node B and the middle output node D.

Figure 5:
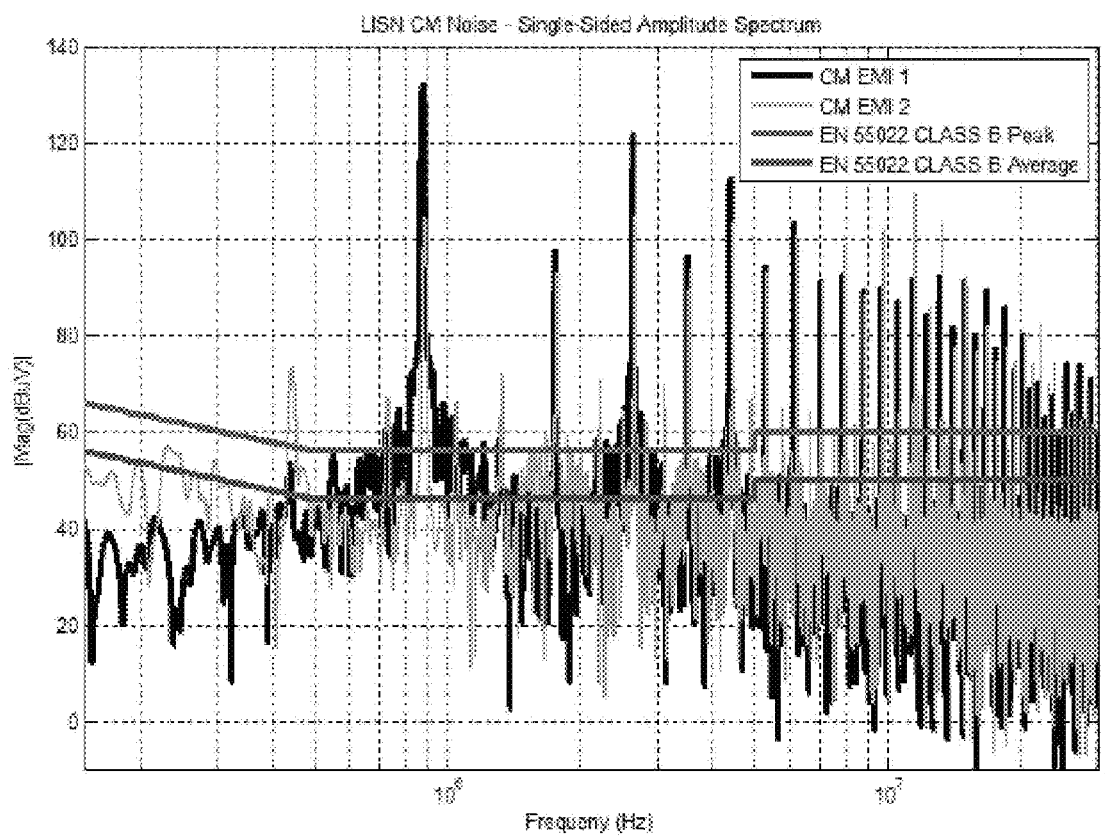
FIG. 5 shows measurement results for a full bridge LLC resonant converter according to an embodiment of the subject invention.
Figure 6:
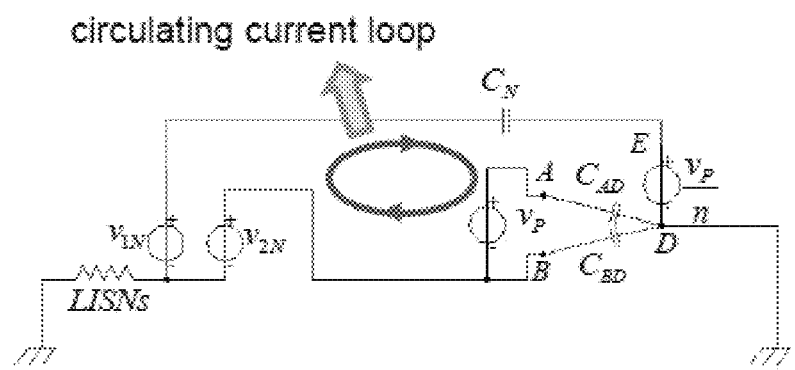
FIG. 6 shows circulating current loop of a full bridge LLC resonant converter according to an embodiment of the subject invention.

FIG. 5 shows measurement results for a full bridge LLC resonant converter according to an embodiment of the subject invention. Referring to FIG. 5, the EMI noise was reduced by more than 20 dBs at switching frequency when comparing CM EMI 1 (without capacitor $C_N$) with CM EMI 2 (with capacitor $C_N$). However, referring to FIG. 6, the capacitor $C_N$ connecting the primary side and the secondary side inevitably made a circulating current loop and caused a loop impedance. Therefore, the performance of the full bridge LLC resonant converter can be improved by decreasing the loop inductance.

Figure 7:
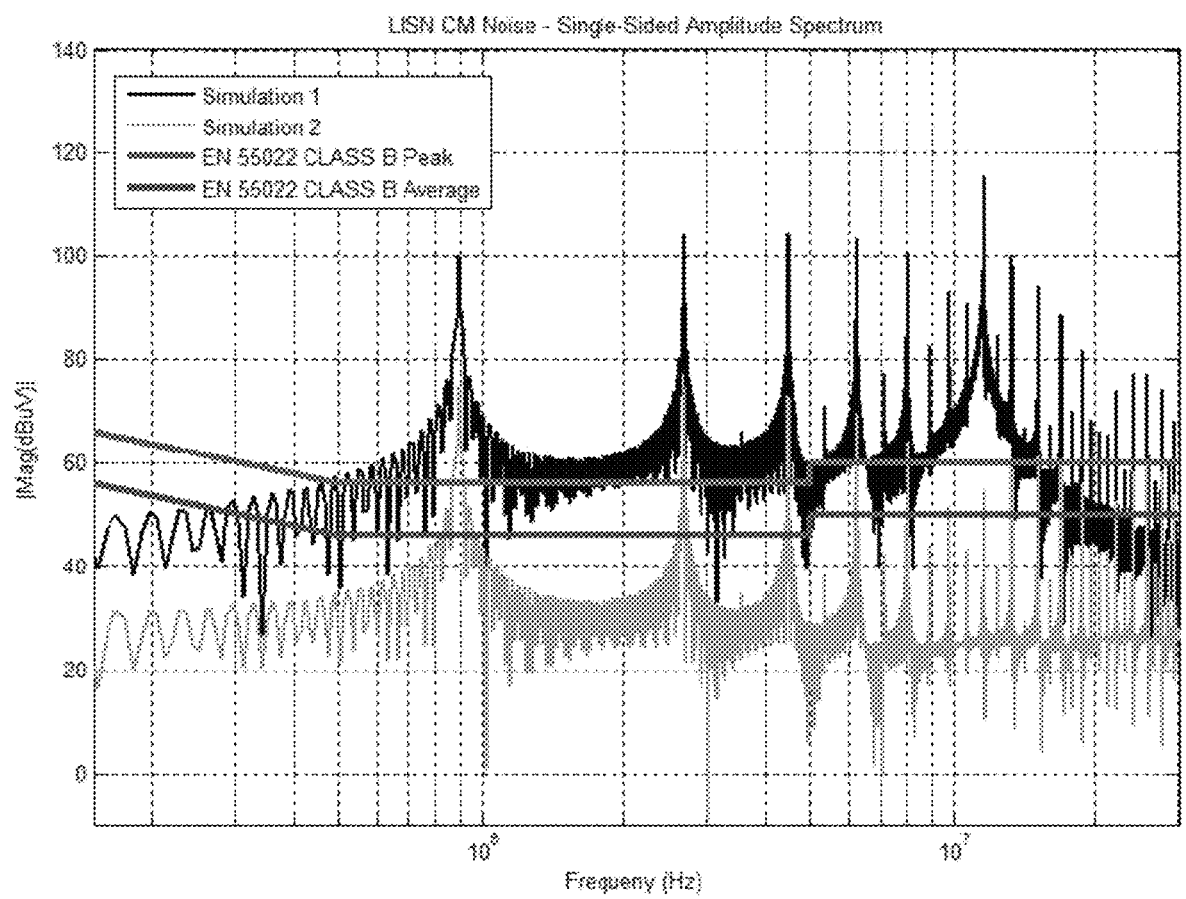
FIG. 7 shows simulation results for circulating current loop of a full bridge LLC resonant converter according to an embodiment of the subject invention.

FIG. 7 shows simulation results for circulating current loop of a full bridge LLC resonant converter according to an embodiment of the subject invention. Referring to FIG. 7, simulation 1 was tested at a loop inductance of 0.035 µH (microHenry) and simulation 2 was tested at a loop inductance of 1 nH (nanoHenry), where the CM noise of simulation 2 decreased sharply. The reduction of the loop inductance was mainly determined by the loop area; therefore, the loop inductance can be reduced by rearranging the PCB layout.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:
1. A full bridge resonant converter, comprising:
a full bridge circuit receiving an input signal and comprising a first input node and a second input node;
a resonant tank circuit connected between the full bridge circuit and a transformer, wherein the resonant tank circuit comprises a resonant capacitor directly connected to the first input node and is connected to the transformer via a primary upper node of the transformer;
the transformer further connected to the full bridge circuit via the second input node;
a rectifier circuit connected to the transformer and producing an output signal; and
a capacitor comprising a first node and a second node, wherein the first node of the capacitor is directly connected to the first input node and the second node of the capacitor is connected to an output node of the transformer.

2. The full bridge resonant converter according to claim 1, wherein the rectifier circuit is connected to the transformer through the output node of the transformer.

3. The full bridge resonant converter according to claim 1, wherein the resonant tank circuit further comprises a resonant inductor.

4. The full bridge resonant converter according to claim 3, wherein the transformer comprises a magnetizing inductance, and wherein the resonant capacitor, the resonant inductor, and the magnetizing inductance are connected in series.

5. The full bridge resonant converter according to claim 1, wherein the full bridge circuit comprises a first switch, a second switch, a third switch, and a fourth switch, wherein the first switch and the third switch are connected in series, the second switch and the fourth switch are connected in series, and a first pair comprising the first and third switches and a second pair comprising the second and fourth switches are connected to each other in parallel.

6. The full bridge resonant converter according to claim 5, wherein the first switch and the third switch are connected to the capacitor through the first input node.

7. The full bridge resonant converter according to claim 5, wherein each of the first, second, third, and fourth switches is a metal oxide semiconductor field effect transistor (MOSFET).

8. The full bridge resonant converter according to claim 1, wherein the transformer comprises a primary winding at a primary side, a first secondary winding at a secondary side, and a second secondary winding connected in series to the first secondary winding at the secondary side.

9. The full bridge resonant converter according to claim 8, wherein the first secondary winding is connected to the capacitor through the output node of the transformer.

10. The full bridge resonant converter according to claim 1, wherein the rectifier circuit comprises a fifth switch and a sixth switch, wherein the fifth switch is connected to the output node of the transformer.

11. The full bridge resonant converter according to claim 10, wherein each of the fifth switch and the sixth switch is a diode.

12. A resonant converter, comprising:
a primary side input circuit receiving an input signal;
a transformer connected to the primary side input circuit;
a secondary side output circuit connected to the transformer and providing an output signal; and
a capacitor connecting the primary side input circuit to the secondary side output circuit, wherein:
the primary side input circuit comprises a resonant tank circuit connected between a first input node and a second input node, wherein the resonant tank circuit comprises a resonant capacitor directly connected to the first input node;
the transformer connected to the first input node through the resonant tank circuit and connected to the second input node; and
the capacitor comprises a first node and a second node, wherein the first node of the capacitor is directly connected to the first input node and the second node of the capacitor is connected to the secondary side output circuit.

13. The resonant converter according to claim 12, wherein the primary side input circuit further comprises a full bridge circuit receiving the input signal and comprising the first input node and the second input node.

14. The resonant converter according to claim 13, wherein the full bridge circuit comprises a first switch, a second switch, a third switch, and a fourth switch, wherein the first switch is connected to the third switch through the first input node, and wherein the second switch is connected to the fourth switch through the second input node.

15. The resonant converter according to claim 12, wherein the resonant tank circuit further comprises a resonant inductor connected to the resonant capacitor.

16. The resonant converter according to claim 15, wherein the transformer comprises: a magnetizing inductance connected between the resonant inductor and the second input node; a primary winding connected to the magnetizing inductance; a first secondary winding connected to a first output node; and a second secondary winding connected to the first secondary winding through a middle output node.

17. The resonant converter according to claim 16, wherein a winding direction of the primary winding is the same as that of the first secondary winding and that of the second secondary winding.

18. The resonant converter according to claim 16, wherein the secondary side output circuit comprises a rectifier circuit comprising a fifth switch connected to the transformer through the first output node and a sixth switch connected to the transformer through a second output node.

19. The resonant converter according to claim 18, wherein the fifth switch is connected to the sixth switch through a common output node.

20. The resonant converter according to claim 19, further comprising a load configured to be connected between the middle output node and the common output node.

21. The resonant converter according to claim 16, wherein the capacitor is connected to the first output node.

22. A full bridge LLC resonant converter, comprising:
a full bridge circuit including a first input node and a second input node;
an LLC resonant tank circuit connected to the first input node and the second input node, wherein the LLC resonant tank circuit comprises a resonant capacitor directly connected to the first input node and a magnetizing inductance connected to the first input node through remaining electrical elements of the LLC resonant tank circuit;
a transformer winding part connected to the LLC resonant tank circuit, wherein the transformer winding part comprises a primary winding connected in parallel with the magnetizing inductance;
a rectifier circuit connected to the transformer winding part through a first output node and a second output node; and
a capacitor comprising a first node and a second node, wherein the first node of the capacitor is directly connected to the first input node and the second node of the capacitor is connected to the first output node.

23. The full bridge LLC resonant converter according to claim 22, wherein the LLC resonant tank circuit further comprises a resonant inductor connected to the resonant capacitor, and wherein the magnetizing inductance is connected between the resonant inductor and the second input node.

24. The full bridge LLC resonant converter according to claim 22, wherein the primary winding is connected to the magnetizing inductance through a primary upper node and a primary lower node, and wherein the transformer winding part further comprises a first secondary winding connected between the first output node and a middle output node, and a second secondary winding connected between the middle output node and the second output node.

25. The full bridge LLC resonant converter according to claim 24, wherein a sum capacitance of a first capacitance between the primary upper node and the middle output node and a second capacitance between the primary lower node and the middle output node is the same as a capacitance of the capacitor between the first input node and the first output node.

26. The full bridge LLC resonant converter according to claim 25, further comprising an assistance capacitor between the primary lower node and the middle output node such that the sum capacitance of the first capacitance between the primary upper node and the middle output node and the second capacitance between the primary lower node and the middle output node is the same as the capacitance of the capacitor between the first input node and the first output node.

27. The full bridge LLC resonant converter according to claim 25, wherein a first ratio of the sum capacitance to the first capacitance is N to 1, and a second ratio of a primary winding voltage between the primary upper node and the primary lower node to a first secondary winding voltage between the first output node and the middle output node is N to 1.

28. The full bridge LLC resonant converter according to claim 22, wherein the full bridge circuit comprises a first switch, a second switch, a third switch, and a fourth switch, wherein the first switch is connected to the third switch through the first input node, and wherein the second switch is connected to the fourth switch through the second input node.

29. The full bridge LLC resonant converter according to claim 28, wherein a first input voltage of the third switch and a second input voltage of the fourth switch have a same absolute value with different signs.

* * * * *